Figure 1:
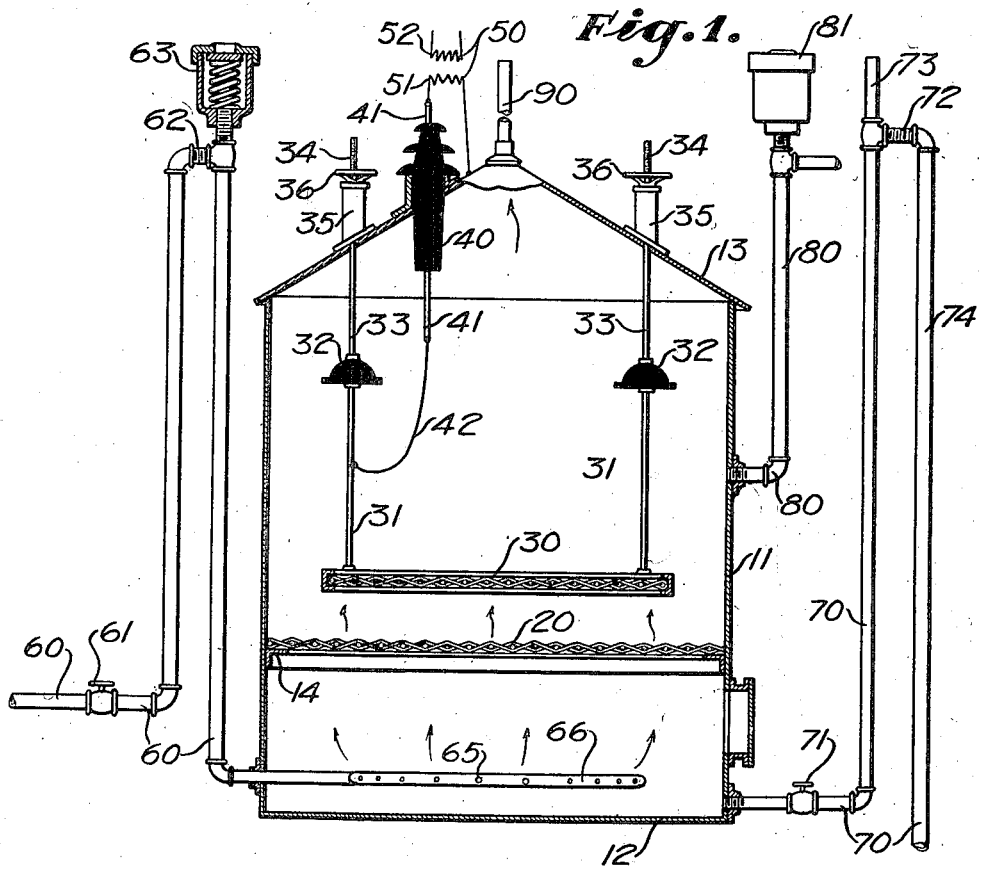

Jan. 2, 1923.

W. O. EDDY.
DEHYDRATOR.
FILED DEC. 27, 1921.

1,440,776

INVENTOR:
WILLIAM O. EDDY,
BY Graham + Suins
ATTORNEYS.

Patented Jan. 2, 1923.

1,440,776

UNITED STATES PATENT OFFICE.

WILLIAM O. EDDY, OF LOS ANGELES, CALIFORNIA, ASSIGNOR TO PETROLEUM RECTI-FYING COMPANY OF CALIFORNIA, OF SAN FRANCISCO, CALIFORNIA, A CORPORATION OF CALIFORNIA.

DEHYDRATOR.

Application filed December 27, 1921. Serial No. 525,092.

*To all whom it may concern:*

Be it known that I, WILLIAM O. EDDY, a citizen of the United States, residing at Los Angeles, in the county of Los Angeles and State of California, have invented a new and useful Dehydrator, of which the following is a specification.

My invention relates to the art of dehydrating emulsions by the so called electrical process. In this process a body of emulsion is passed between electrodes having a potential impressed therebetween, the effect of the electric potential being to cause the fine water particles to collect together into larger masses which readily settle out under the action of gravity.

The object of my invention is to produce a dehydrator which will have certain advantages which will be made more evident hereinafter.

Referring to the drawings which are for illustrative purposes only,

Fig. 1 is a cross section through a preferred embodiment of my invention.

Figure 2:
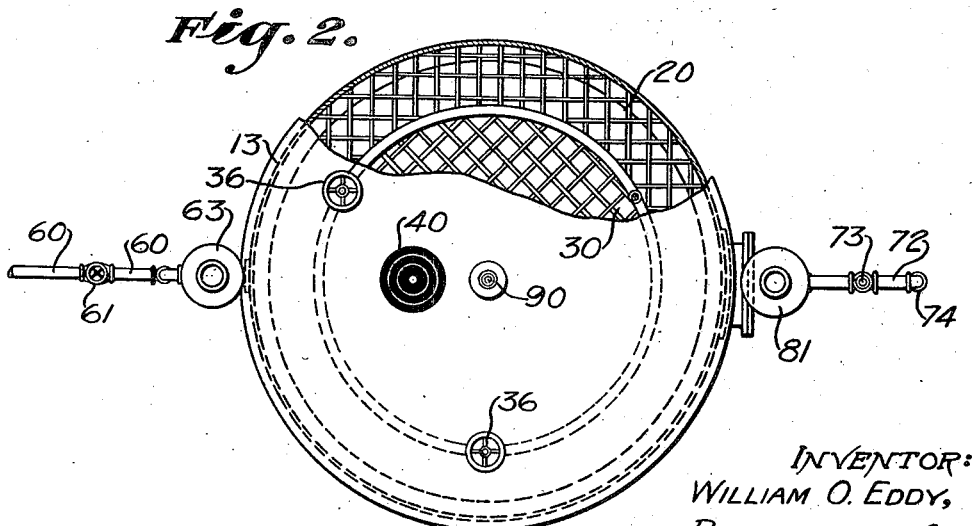

Fig. 2 is a plan view of same, a portion thereof being cut away to better illustrate the internal structure.

In the form of the invention shown, I provide a tank 11 having a tight bottom 12 and a tight top 13. Secured inside the tank on angle irons 14 is a lower electrode 20, this electrode being solidly and electrically connected to the tank 11. Suspended above the lower electrode 20 is an upper electrode 30, this electrode being suspended on three rods 31, each of which is secured in the lower end of a porcelain insulator 32. Secured in the top of the porcelain insulators 32 are rods 33 which are threaded at their upper ends 34.
These rods pass through stuffing boxes 35 and are engaged by hand wheels 36 by means of which the rods may be raised and lowered and the distance between the electrodes 20 and 30 may be varied. An insulator 40 is secured in the top of the tank having a rod 41 passing through the center. The lower end of the rod 41 is connected by means of a flexible wire 42 with one of the rods 31. The secondary 51 of a transformer 50 is connected between the upper end of the rod 41 and the top 13 of the tank 11. The primary 52 of the transformer 50 is excited from any convenient source.

The emulsion to be treated is delivered through piping 60 having a valve 61 therein, this piping being turned upwardly and having connection with a nipple 62 which is somewhat higher than the extreme peak of the top 13. A check valve 63 is connected into the piping 60 above the nipple 62, this valve being so arranged that it will admit air to the piping but closes as soon as any internal pressure is put upon the piping. The piping 60 passes downwardly into the bottom of the treater, the oil being delivered to the treater through small holes 65 in a circular pipe 66. Water is withdrawn from the bottom of the treater through piping 70 having a valve 71, the piping 70 passing up and including a nipple 72 which is above the extreme peak of the top 13. An open pipe 73 provides a vent for the piping 70 which passes downwardly as shown at 74 to suitable drainage. Cleaned oil is taken off from the tank through piping 80 which passes upwardly and is connected to a valve 81. This check valve 81 is exactly similar to the check valve 63 previously described. The extreme peak of the top 13 is provided with a gas vent pipe 90. This pipe is extended up for some distance and provides means for the ready escape of any vapor or gas which may be delivered or formed inside the dehydrator.

The method of operation of my invention is as follows:

Emulsion is delivered to the piping 60 passing through the nipple 62 which is higher than the peak of the top 13. The object of passing the emulsion through the nipple 62 so placed is to prevent the tank from being emptied by a back flow through the piping 60. In the event that the supply of emulsion is shut off and the piping 60 is left open, liquid will not flow back through the piping due to the fact that the siphoning is prevented by the check valve 63 and it is impossible to cause emulsion to flow from the tank through the nipple 63 which is higher than the top of the tank. In the same way the pipings 70 and 80 are so arranged that the tank will not be drained by either of these pipes thus insuring the tank always being full of liquid excluding oxygen and therefore reducing the explosion and fire risk. The emulsion is delivered to the bottom of the tank through the pipe 66. It is to be noted that this emulsion is to be delivered at a point below the lower electrode 20 and that the cleaned oil is taken from the tank at a point above the upper electrode 30.

It should also be borne in mind that the cleaned oil is lighter than the emulsion due to the fact that the oil has been freed from its water which readily settles allowing the cleaned oil to rise. It should also be noted that the tank is a very large area as compared to the inlet and outlet pipes and that it is free from agitation and stratification of the water and oil takes place therein. The result of this is that as soon as treatment starts, the cleaned oil tends to rise to the top of the tank and the water tends to settle in the bottom, there being a gradual increase of the water content from the bottom to the extreme top of the tank. This produces a stratified field in the space between the electrodes 20 and 30, the lower portion of this field being very wet and the upper portion being comparatively dry. The dry oil around the electrode 30 acts as a dielectric and prevents the passage of disruptive discharges through the body of oil or emulsion thus allowing a high voltage to be maintained between the electrodes without appreciable current flow. It has been found that this condition is necessary to successful dehydration.

It will be noted that the cleaned oil outlet is not placed at the extreme top of the tank but at a point below the insulator 32. This is for the purpose of gradually accumulating a body of extremely dry oil around the insulator 32 and the insulator 40. This body of dry oil being lighter than the treated oil withdrawn through the pipe 80 remains in the top of the treater and forms an effective insulation reinforcing the insulators 32 and 40. The water is withdrawn through the piping 70, the flow of water being controlled by the valve 71.

I claim as my invention:

1. In a dehydrator for emulsions, the combination of; a tank; a lower electrode in said tank; an upper electrode suspended in said tank above said lower electrode; means for delivering emulsion to said tank at a point below said upper electrode; means for withdrawing clean oil from said tank at a point above said upper electrode; and means for withdrawing water from said tank at a point below said lower electrode.

2. A dehydrator as in claim 1 in which the lower electrode is perforated with openings to allow the ready escape of water downwardly therethrough.

3. A dehydrator as in claim 1 in which the upper electrode is adjustable up and down to vary the gap between said electrodes.

4. A dehydrator as in claim 1 in which the upper electrode is suspended upon insulating means inside the tank but below the clean oil outlet.

5. A dehydrator as in claim 1 in which the upper electrode is perforated with holes to allow clean oil and gas to escape upwardly therethrough.

In testimony whereof, I have hereunto set my hand at Los Angeles, California, this 20th day of December, 1921.

WILLIAM O. EDDY.